United States Patent [19]
Nordskog

[11] 3,878,772
[45] Apr. 22, 1975

[54] REUSABLE COFFEE MAKER CONTAINER

[75] Inventor: Robert A. Nordskog, Tarzana, Calif.

[73] Assignee: Nordskog Company Inc., Van Nuys, Calif.

[22] Filed: Mar. 1, 1974

[21] Appl. No.: 447,286

[52] U.S. Cl. .................................. 99/295; 99/306
[51] Int. Cl. ............................................ A47J 31/00
[58] Field of Search ............ 99/295, 304, 306, 323, 99/307, 308, 302, 305; 426/77, 78

[56] References Cited
UNITED STATES PATENTS

| | | | |
|---|---|---|---|
| 3,260,190 | 7/1966 | Levinson | 99/295 |
| 3,470,812 | 10/1969 | Levinson | 99/295 |
| 3,502,017 | 3/1970 | Alexander | 99/295 |
| 3,793,935 | 2/1974 | Martin | 99/295 |

*Primary Examiner*—Robert W. Jenkins
*Attorney, Agent, or Firm*—Robert E. Geauque

[57] ABSTRACT

The reusable coffee maker container of this invention is to be employed in combination with prior art structure comprising a coffee maker which uses the coffee supply can itself as the brewing chamber. The normal mode of operation on the original equipment is to insert the coffee supply can within the apparatus and perforate both the can top and bottom. Water is passed through the coffee can with the coffee being brewed within the can and then conducted into a catching container. The reusable container of this invention provides for the inclusion of a quantity of instant coffee. It is then to be inserted within the prior art apparatus thereby eliminating the coffee supply can. The reusable container of this invention is constructed so that the knives and perforation means of the prior art apparatus does not cut into the reusable container of this invention. The reusable container of this invention provides for the making of instant coffee without any modification of the prior art coffee making unit.

9 Claims, 7 Drawing Figures

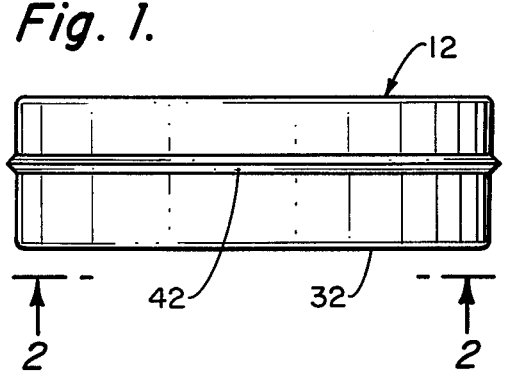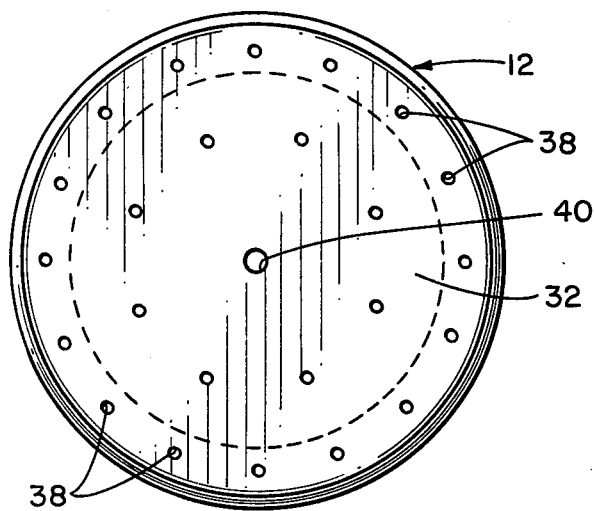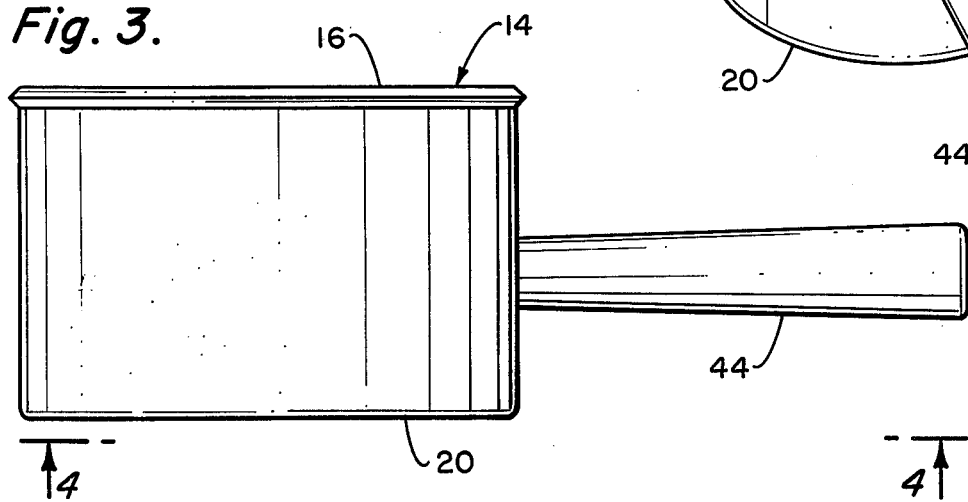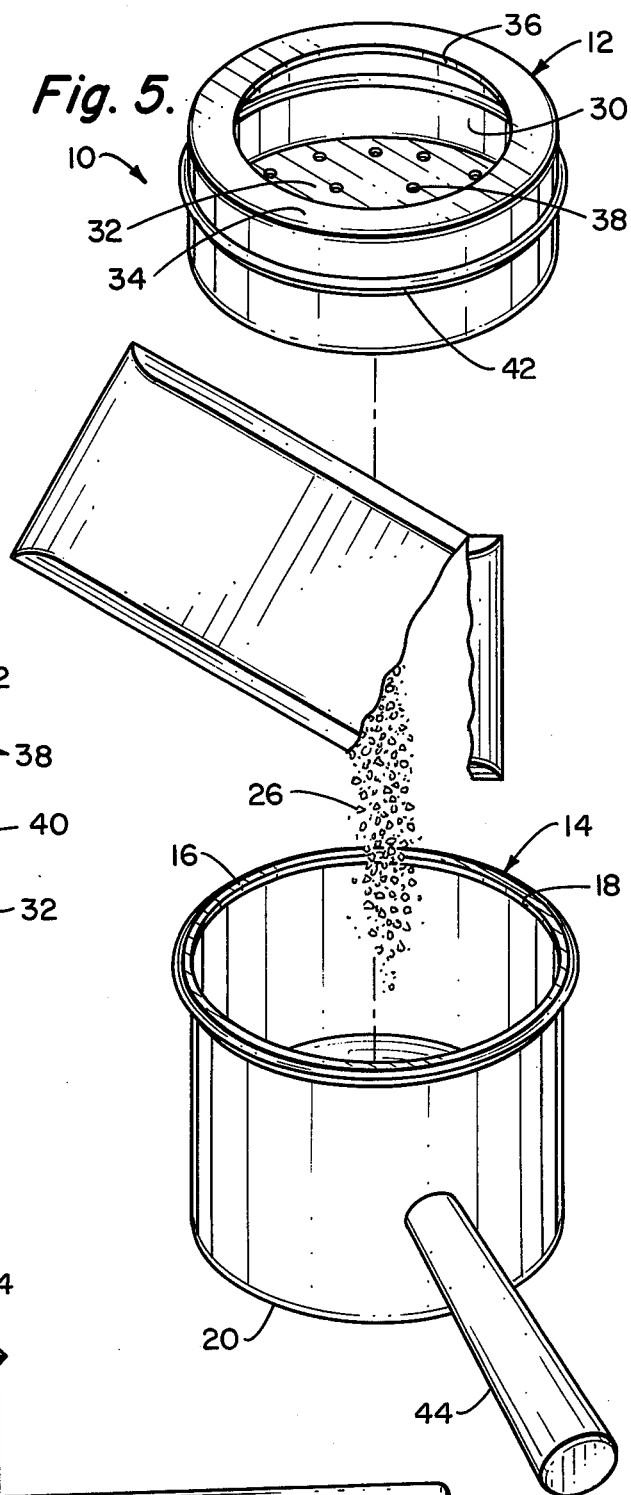

REUSABLE COFFEE MAKER CONTAINER

BACKGROUND OF THE INVENTION

The apparatus of this invention is designed to be employed in particular with a coffee maker which is in common use within aircraft. However, it is considered that the coffee maker could be employed in other environments than in aircraft and also the container of this invention could be employed in other coffee maker environments.

For purposes of convenience, most commercial aircraft employ a coffee maker which only requires the coffee can itself which contains coffee grounds to be inserted within the coffee maker and the coffee maker is then closed and the coffee is then brewed. When the coffee maker is closed, the top and bottom surfaces of the coffee can are perforated and hot water is conducted into the coffee can and then permitted to seep exteriorly therefrom into a catching container. After the coffee is brewed, the coffee can containing the grounds of coffee is removed and discarded and now the coffee maker is ready for reuse. The inlet water temperature is normally about 195° F which will result in the temperature of the brewed coffee to be approximately 170° F.

The disadvantage of the aforementioned coffee maker apparatus is that is is not adaptable to use of instant coffee. There has been a steady improvement in recent years in the quality of instant coffee to the point where many people actually prefer instant coffee to fresh brewed coffee. Additionally, some instant coffees taste very similar to fresh brewed coffee.

The cost of the coffee can containing the coffee grounds is more than twice as expensive than the amount of a packet containing instant coffee which will brew the same amount of coffee. Besides the additional expense, when using the coffee can, trash is produced in the form of empty cans. Also, there is the problem on an aircraft, where storage space is minimal. of storing the cans of coffee where packets of instant coffee can be readily stored in a much smaller space.

SUMMARY OF THE INVENTION

The primary feature of the apparatus of this invention is to reduce the cost of brewing coffee to approximately one half of the cost of using a container containing coffee grounds. A further advantage of the apparatus of this invention is to completely eliminate the producing of any coffee grounds and a throw-away coffee can. Another advantage of the apparatus of this invention is that it makes it possible to continue the use of the canned coffee until present stocks are depleted and then to phase in the use of instant coffee. The apparatus of this invention provides that there is no modification of existing equipment.

The conventional coffee maker which the container of this invention is to be employed in combination therewith includes an upper cover element and a lower base element. The entire coffee maker is to be mounted on a separate supporting structure such as a wall or other supporting structure. The cover is to be manually movable between a closed position and an open position. Water inlet means is provided into the cover and coffee outlet means is provided within the base. A catching container such as a coffee pot is to be located beneath the base with the brewed coffee to flow thereinto. When the cover is in the open position, the conventional manner of employing the coffee maker of this invention is to permit access of a coffee can which contains approximately three ounces of coffee grounds. The cover is then moved to the closed position. Around the water inlet means formed in the cover is a perforation apparatus which punches a hole within the top surface of the coffee can. At the same time, during the closing movement, there are a plurality of knives formed within the base which similarly perforate the bottom surface of the coffee can. Hot water is then conducted to within the coffee can and then conducted into the coffee pot. The apparatus of this invention provides for a reusable container to be employed in lieu of the coffee can. The reusable container is composed of two parts, a strainer and a undercup. The undercup includes an internal recess which when located upon the base of the coffee maker, the knives are located within the recess and do not puncture the undercup. Instant coffee is to be placed within the undercup about the periphery of the recess. A plurality of holes are formed within the lower edge of the strainer and communicate with the annular chamber containing the instant coffee. The strainer is telescopingly received in a tight fitting manner within the upper opening of the undercup. The lower surface of the strainer includes a plurality of distributing apertures which is to evenly distribute the hot water prior to coming into contact with the instant coffee. An annular extending bead is formed upon the outer sidewall of the strainer and is to come into contact with the upper edge of the undercup. An access opening for the hot water is formed within the upper surface of the strainer. The size of the access opening is determined by a flat annular lip included as part of the strainer. The annular lip is to come into contact with the underside of the cover and establish a liquid leakage-free interconnection therebetween. The undercup includes a handle attached thereto and extending therefrom. The handle is to facilitate entry and removal of the reusable container of this invention with respect to the coffee maker. The perforation means formed within the cover extends within the access opening and does not in any way mar or damage the strainer.

BRIEF DESCRIPTION OF THE DRAWINGS

FIG. 1 is a side view of the strainer element of the reusable container of this invention;

FIG. 2 is a bottom view of the strainer element taken along line 2—2 of FIG. 1;

FIG. 3 is a side view of the undercup element formed within the reusable container of this invention;

FIG. 5 is an exploded view of the reusable container of this invention showing the location of the instant coffee within the undercup prior to use;

DETAILED DESCRIPTION OF THE SHOWN EMBODIMENT

Figure 4:
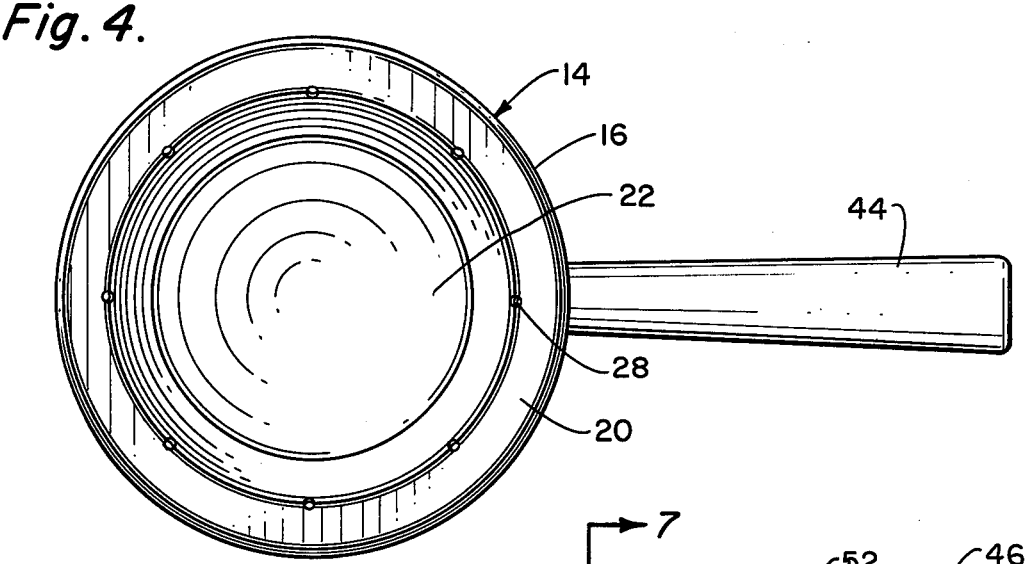
FIG. 4 is a bottom view of the undercup taken along line 4—4 of FIG. 3.

Referring particularly to the drawings there is shown in FIG. 5 the reusable container 10 of this invention which is composed of a strainer 12 and an undercup 14. Both the strainer 12 and the undercup 14 are formed cylindrical in configuration. The undercup 14 is formed in the shape of a conventional cooking pan and includes an upper edge 16 located about a large entry opening 18. The edge 16 is formed in the shape of a slight bead which extends outwardly from the side wall of the undercup. The reason for this is that the edge 16 is then formed to be slightly resilient and also that the outer most edge of the bead 16 extends slightly inwardly. The function of this inward extension of the bead 16 will be explained further on in the specification.

The lower edge 20 of the undercup 14 has formed therein an internal enlarged central recess 22. Located within the undercup 14 about the wall of the recess 22 and between the outer side wall of the undercup 14 is an annular chamber 24. The function of the annular chamber 24 is to retain a quantity of instant coffee granules 26. The amount of coffee to be located within the chamber 24 will be standardized and supplied in packets. It has been found that 0.56 ounces of instant coffee is sufficient to produce 48 ounces of brewed coffee.

Figure 7:
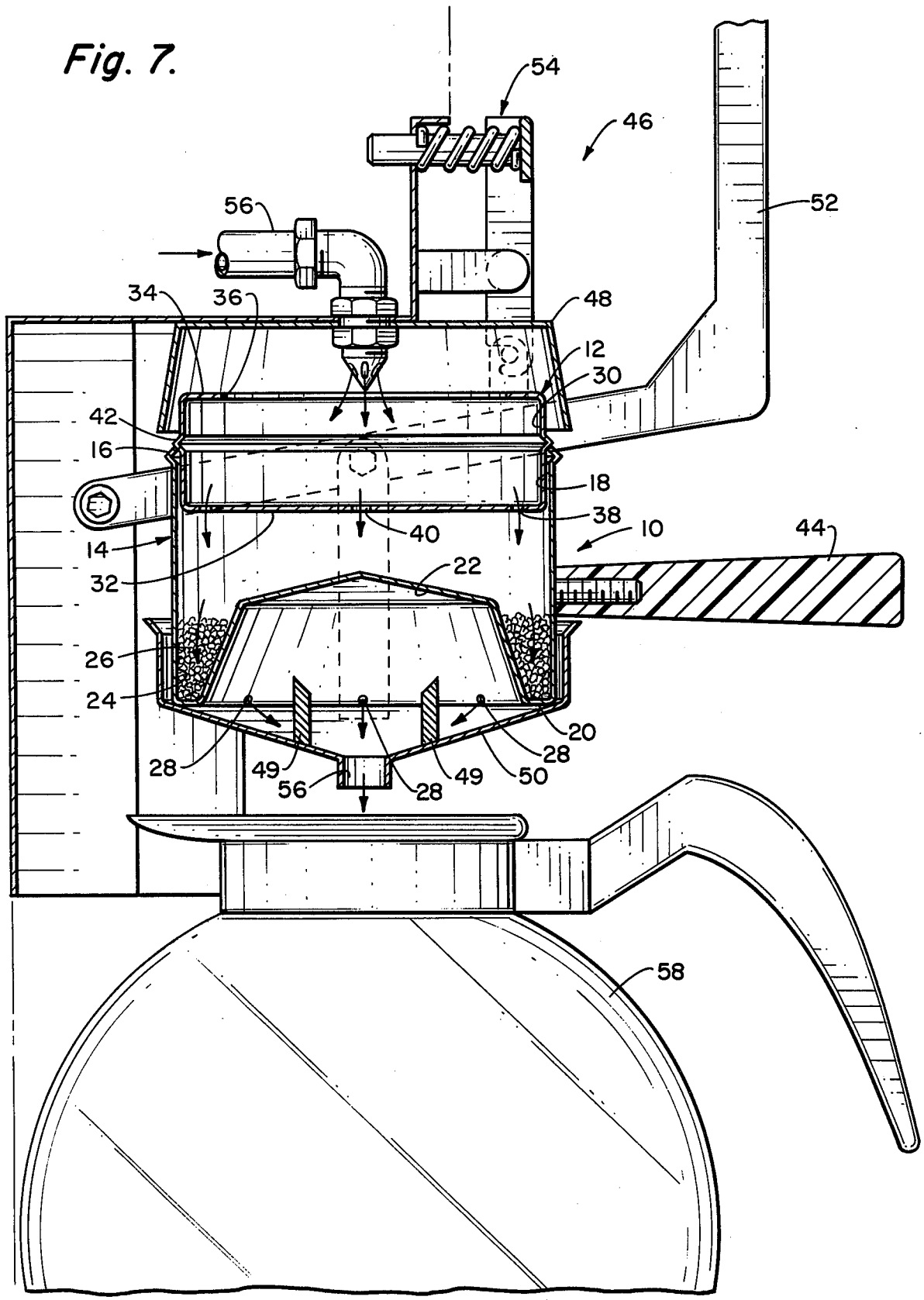
FIG. 7 is a cross-sectional view through the coffee maker and the reusable container of this invention taken along line 7—7 of FIG. 6.

Formed within the lower edge 20 are a plurality of holes 28. Referring in particular to FIG. 7 of the drawings, the holes 28 are displaced slightly from the bottom edge and extend partially within the confines of the recess 22. The brewed coffee is to be conducted through the holes 28 and it is desirable that the passage of the coffee therethrough not be restricted. When the undercup 14 is placed within the coffee maker, yet to be described, there is the possibility that the flow would be restricted if the holes were located wholly within the bottom edge and such being closed off by the coffee maker structure. It is desirable that 48 ounces brewed coffee be produced within three to three and a half minutes. It is for this reason that the flow of the coffee out through the holes 28 be made as free as possible.

The strainer 12 includes an interior chamber 30 which is closed off at one end by a distributing surface 32. The upper edge of the strainer 12 includes an annular flat lip 34 which defines an enlarged access opening 36. Formed within the distributing surface are a plurality of distributing apertures 38. The size of these apertures are to be small enough to readily distribute the hot water within the undercup 14. It is found to be preferable that the apertures 38 be formed with the number 40 size drill bit.

Formed centrally within the surface 32 is an enlarged aperture 40 formed with the number 30 size drill bit. This will cause hot water to be conducted upon the upper wall of the recess 22. Because of the sloping sides of the wall of the recess 22, the hot water will be conducted onto the coffee 26. By the use of the smaller distributing apertures 38 and the enlarged aperture 40 it has been found that an even distribution of the water upon the coffee granules 26 results.

The strainer 12 also includes an annular bead 42 which is formed on the side wall of the strainer 12 and extends outwardly therefrom. The outer diameter of the strainer 12 is slightly smaller than the internal opening formed within the undercup 14. The strainer 12 is to fit in a telescoping tight fitting manner within the undercup 14 so that the bead 42 comes into contact with the bead 16. The outer section of the bead 16 comes into perpendicular contact with the lower section of the bead 42. This provides for a tight, liquid leakage-free interconnection between the strainer 12 and the undercup 14.

A handle 44 is permanently attached to the undercup 14 and extends from the side wall thereof. The function of the handle will be explained in the operation of the subject matter of this invention.

The reusable container 10 of this invention is to be employed in combination with a coffee maker denoted generally as numeral 46. Constructional details of the coffee maker 46 will not be described, but it is considered that basically such coffee makers are the state-of-the-art. Basically, the coffee maker 46 includes a cover 48 and a base 50. The cover 48 is movable relative to the base 50 by manual movement of a lever 52. The cover 48 is in the partially open position shown in FIGS. 6 and 7 of the drawings. A spring biasing arrangement 54 is employed to hold the cover 48 in the open position when open and also to tightly hold the cover in the closed position when closed. The base 50 includes a central discharge opening 56 which is to discharge brewed coffee into a catching container (or coffee pot) 58 located beneath the coffee maker 46.

Figure 6:
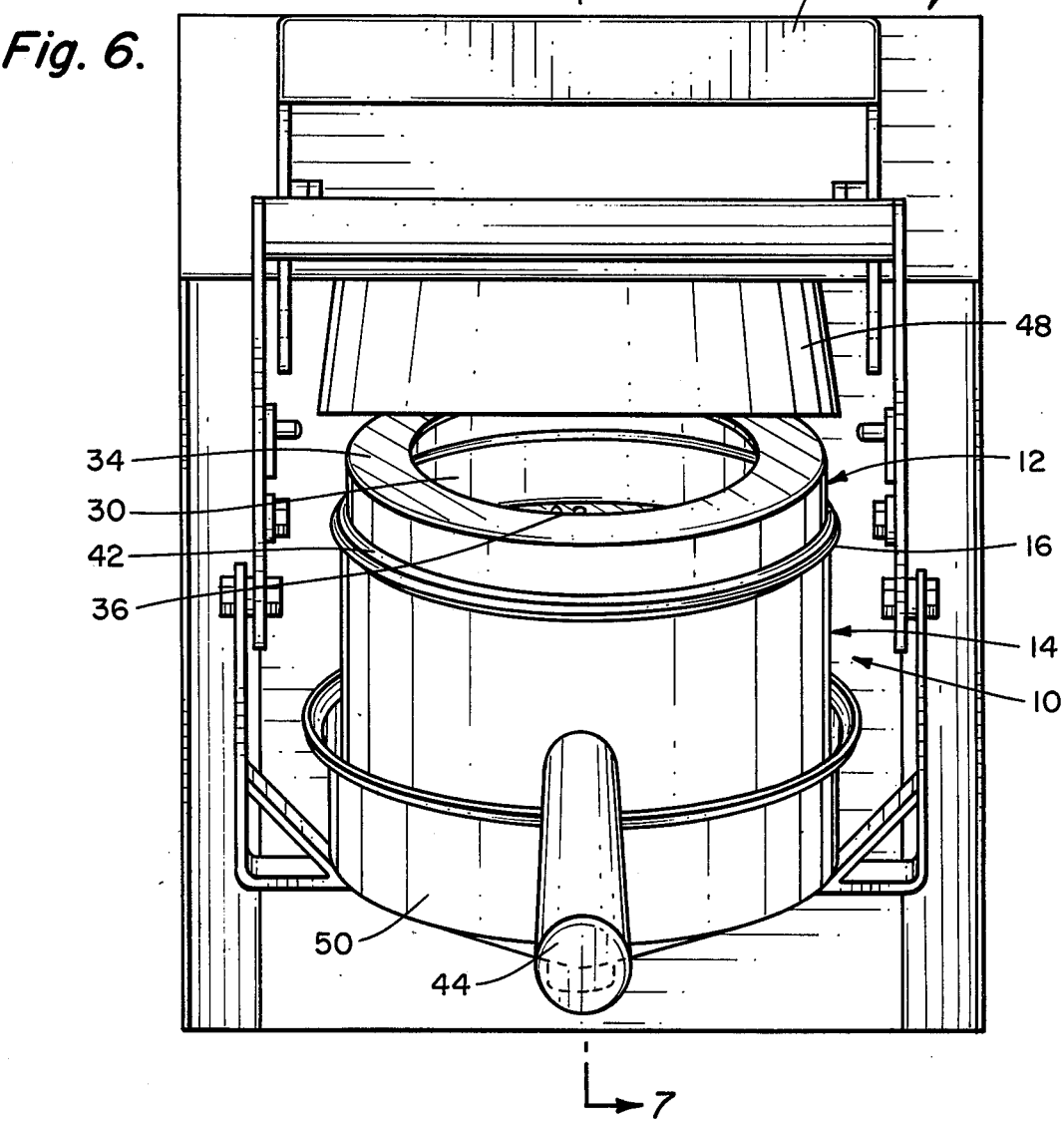
FIG. 6 is a front view through the reusable container of this invention as located within the coffee maker.

The reusable container 10 of this invention is to be assembled with the strainer 12 located within and upon the undercup 14 and also include the coffee granules 26 within the chamber 24. A person, by grasping of handle 44, places the container within the coffee maker 46 as shown in FIGS. 6 and 7 of the drawings. There are placed upon the base 50 a plurality of knives 49 which are adapted to puncture a coffee can. These knives are to rest within the confines of recess 22 and do not function to puncture any portion of the undercup 14.

A water inlet conduit 56 is connected to the cover 48 and is to function to supply hot water at approximately 195° into the confines of the strainer 12. The portion of the conduit extending within the cover 48 is formed to include a sharp edge and is to function to perforate a conventional coffee can. When the cover 48 is in the closed position this sharp edge passes through the access opening 36 and is positioned within the strainer 12 and does not function to puncture any wall surface of the strainer 12. When the cover 48 is tightly closed, the under surface of the cover 48 is in a tight engagement with the upper surface of the lip 34. The area of the lip 34 functions to provide a liquid tight leakage-free seal between the strainer 12 and the cover 48. Also, the spray which was emitted from the conduit 56 is caused to be confined within the strainer 12 due to the overhang of the lip 34.

The clamping action of the cover 48 in the closed position upon the strainer 12 functions to bind the strainer 12 into tight engagement with the undercup 14. This prevents leakage of fluid between the beads 16 and 42. It is to be understood that the hot water conducted within the reusable container 10 is under some pressure and will normally readily leak if a tight interconnection between all the elements is not established. Once the cover 48 is in the closed position, measured amount (usually 48 ounces) of hot water is caused to be conducted within the strainer 12 and thereupon is passed through the distributing apertures 38 and 40 and into contact with the coffee granules 26. The water then takes the form of brewed coffee which is passed through holes 28 into discharge opening 56 and into the catching container 58.

What is claimed is:

1. In combination with a coffee maker having a base and a cover, said cover being movable relative to said base between an open position and a closed position, with said cover in said closed position a selected size of coffee container is adapted to be clamped in a liquid tight fitting manner between said cover and said base, said base including knives to penetrate the bottom surface of said coffee container, said cover including a perforation means to puncture the top side of said coffee container, means for supplying hot water through said perforation means into said coffee container with the resultant brewed coffee exiting adjacent said knives and into a catching container, the improvement comprising:

a reusable container to be usable in lieu of said coffee container, said reusable container having a top edge and a bottom edge, said top edge to contact said cover establishing a liquid leakage-free interconnection therebetween, an access opening formed about said top edge surrounding said perforation means, said bottom edge having a plurality of holes located in an annular arrangement, a central recess formed within said bottom edge, said knives extending into said recess, whereby instant coffee crystals are to be placed within said reusable container and the hot water from said perforation means passes through said access opening and through the coffee crystals and out through said holes and into the catching container.

2. The combination as defined in claim 1 wherein: said reusable container comprises an undercup and a strainer, said undercup to be in contact with said base, said strainer to be in contact with said cover, a portion of said strainer to extend within the confines of said undercup, said strainer having a lower surface, said lower surface including a plurality of distributing apertures, the water to be conducted within said strainer and be substantially evenly distributed before being conducted within said undercup by passing through said distributing apertures.

3. The combination as defined in claim 2 wherein: said strainer being substantially cylindrical in configuration, an annular bead formed on the side of said strainer and extending outwardly therefrom, said annular bead to rest upon the upper edge of said undercup.

4. The combination as defined in claim 3 wherein: each of said holes extending slightly into the confines of said central recess, whereby upon said bottom edge being in contact with said base said holes are not closed off or in any way restricted so as to not permit free flow of said coffee therethrough.

5. The combination as defined in claim 4 wherein: a handle connected to said undercup, with said strainer placed in position upon said undercup said handle to facilitate insertion and removal of said undercup and its associated strainer within said coffee maker.

6. A reusable brewing container to be employed in combination with a coffee maker apparatus, said reusable brewing container comprising:

said container being composed of an undercup and a strainer, said strainer being removable from said undercup, said undercup and said strainer both being cylindrical in configuration, one end of said undercup being substantially open with the other end of said undercup being substantially closed, said closed end of said undercup including a central enlarged recess resulting in the forming of an annular chamber about said central recess within said undercup, a plurality of holes formed within said closed end and communicating with said annular chamber, the diameter of said strainer being such as to partially extend in a telescoping manner within said open end of said undercup, said strainer having a substantially open upper end and a substantially closed lower end, said substantially closed lower end including a plurality of distributing apertures, an annular bead formed within the side of said strainer and extending outwardly therefrom, said annular bead to rest upon the edge of said undercup located about said substantially open end, whereby instant coffee is to be placed within said annular chamber and hot water is to be conducted into said strainer and evenly distributed by said distributing holes prior to being conducted within said undercup, thereby even brewing of the coffee is obtained prior to being passed through said holes.

7. The container as defined in claim 6 wherein: each of said holes extending slightly into the confines of said central recess, whereby upon said bottom edge being in contact with said base said holes are not closed off or in any way restricted so as to not permit free flow of said coffee therethrough.

8. The container as defined in claim 7 wherein: a handle attached to said undercup, said handle to facilitate entry and removal of said undercup and its associated strainer into and out of a coffee maker.

9. The container as defined in claim 6 wherein: said upper edge of said strainer formed into a flat annular lip, whereby upon hot water being sprayed into said strainer said annular flat lip helps prevent leakage of the water exteriorly of said strainer.

* * * * *